United States Patent
Yu et al.

(10) Patent No.: US 8,943,125 B2
(45) Date of Patent: Jan. 27, 2015

(54) METHOD OF HANDLING STEP EXECUTION RESULT IN SOFTWARE AND APPLICATION CONTROL MANAGEMENT OBJECT

(75) Inventors: Chun-Ta Yu, Taoyuan County (TW); Yin-Yeh Tseng, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 35 days.

(21) Appl. No.: 13/277,226

(22) Filed: Oct. 20, 2011

(65) Prior Publication Data

US 2012/0102096 A1    Apr. 26, 2012

Related U.S. Application Data

(60) Provisional application No. 61/394,784, filed on Oct. 20, 2010.

(51) Int. Cl.
  *G06F 15/16* (2006.01)
  *G06F 9/45* (2006.01)
  *H04L 12/24* (2006.01)

(52) U.S. Cl.
  CPC .......... *G06F 8/4435* (2013.01); *H04L 41/0206* (2013.01); *H04L 41/0233* (2013.01)
  USPC ....................................................... 709/203

(58) Field of Classification Search
  USPC ......................... 709/229, 203, 223
  See application file for complete search history.

(56) References Cited

U.S. PATENT DOCUMENTS

| | | | |
|---|---|---|---|
| 7,890,955 B2* | 2/2011 | Paramasivam et al. | 719/313 |
| 8,073,960 B2* | 12/2011 | Hallamaa et al. | 709/229 |
| 8,127,285 B2* | 2/2012 | Mittal | 717/168 |
| 8,392,545 B2* | 3/2013 | Hallamaa et al. | 709/223 |
| 2006/0015626 A1* | 1/2006 | Hallamaa et al. | 709/229 |
| 2006/0020947 A1 | 1/2006 | Hallamaa | |
| 2007/0234369 A1 | 10/2007 | Paramisivam | |
| 2009/0049445 A1* | 2/2009 | Shu et al. | 718/102 |
| 2010/0037088 A1* | 2/2010 | Krivopaltsev et al. | 714/4 |
| 2012/0102096 A1* | 4/2012 | Yu et al. | 709/203 |
| 2013/0091198 A1* | 4/2013 | Yu et al. | 709/203 |
| 2013/0159526 A1* | 6/2013 | Yu et al. | 709/225 |

FOREIGN PATENT DOCUMENTS

| | | |
|---|---|---|
| CN | 101416209 A | 4/2009 |
| EP | 0 280 553 A2 | 8/1988 |
| JP | H11345215 A | 12/1999 |
| JP | 2001147868 A | 5/2001 |
| JP | 2006134005 A | 5/2006 |

(Continued)

OTHER PUBLICATIONS

European patent application No. 11008442.3, European Search Report mailing date: Dec. 21, 2011.

(Continued)

*Primary Examiner* — Kevin Bates
*Assistant Examiner* — Clarence D McCray
(74) *Attorney, Agent, or Firm* — Winston Hsu; Scott Margo

(57) ABSTRACT

A method of handling a step execution result in software and application control management object (SACMO) for a client of a service system supporting Open Mobile Alliance (OMA) device management (DM) is disclosed. The method comprises handling an execution result of a step in software and application control management object for a service system.

8 Claims, 6 Drawing Sheets

(56) References Cited

FOREIGN PATENT DOCUMENTS

JP   2009539149 A   11/2009
WO   0217101 A1    2/2002

OTHER PUBLICATIONS

"SACMO Specification Draft Version 1.0", OMA-TS-SACMO-V1_0-20100727-D, Jul. 27, 2010, p. 1-27, XP55009835.
Office Action mailed on Dec. 4, 2012 for the Japanese application No. 2011-231127, filing date Oct. 20, 2011, pp. 1-3.
OMA-RD-SACMO-V1_0-20100727-C "Software and Application Control Management Object Requirements", Jul. 27, 2010.
OMA-TS-SACMO-V1_0-20101012-D "SACMO Specification", Oct. 12, 2010.
OMA-AD-SACMO-V1_0-20100810-D "SACMO Architecture", Aug. 10, 2010.
OMA-TS-DM_StdObj-V1_3-20100525-C "OMA Device Management Standardized Objects", May 25, 2010.
Notice of allowance mailed on Dec. 26, 2013 for the Korean Application No. 10-2011-0107699, filing date Oct. 20, 2011, pp. 1-2.
Office action mailed on Dec. 24, 2013 for the China application No. 201110322226.X, filing date Oct. 20, 2011.
Office action mailed on Jan. 17, 2014 for the Taiwan application No. 100138155, filing date Oct. 20, 2011, p. 1-5.

* cited by examiner

METHOD OF HANDLING STEP EXECUTION RESULT IN SOFTWARE AND APPLICATION CONTROL MANAGEMENT OBJECT

CROSS REFERENCE TO RELATED APPLICATIONS

This application claims the benefit of U.S. Provisional Application No. 61/394,784, filed on Oct. 20, 2010 and entitled "Method for knowing an execution result of a Step in SACMO", the contents of which are incorporated herein in their entirety.

BACKGROUND OF THE INVENTION

1. Field of the Invention

The present invention relates to a method used in a service system, and more particularly, to a method of handling an execution result of a step in software and application control management object for a service system.

2. Description of the Prior Art

The Open Mobile Alliance (OMA) is founded to develop OMA specifications for mobile services to meet users' needs. Furthermore, the OMA specifications aim to provide the mobile services which are interoperable across geographic areas (e.g. countries), operators, service providers, networks, operation systems and mobile devices. In detail, the mobile services conforming to the OMA specifications can be used by the users without restriction to particular operators and service providers. The mobile services conforming to the OMA specifications are also bearer agnostic, i.e., the bearer that carries the mobile services can be a second generation (2G) mobile system such as GSM, EDGE or GPRS, or a third generation (3G) and beyond mobile system such as UMTS, LTE or LTE-Advanced. Further, the mobile services can be executed on an operation system such as Windows, Android or Linux operated on various mobile devices. Therefore, industries providing devices or the mobile services supporting the OMA specifications can benefit from a largely growing market enabled by interoperability of the mobile services. Besides, the users use the devices or the mobile services supporting the OMA specifications can also have a better experience due to the interoperability of the mobile services.

A device management (DM) protocol conforming to the OMA specifications is designed for management of mobile devices such as mobile phones, PDAs and palm top computers. The device management is intended to support the following typical uses: configuration of device for allowing changes to settings and parameters of the device, software upgrades for providing new software (e.g. applications and system software) and/or bug fixes to be loaded on the device, and fault management for reporting errors from the device, and/or querying about status of the device. In addition, the DM protocol defines a way according to which a DM client (e.g. mobile device) communicates with a DM server (e.g. network), and thereby the DM client can feedback a command, a status or a report to the DM server. Further, the DM server manages the DM client through a set of management objects in the DM client. The management object is conformed to the Software and Application Control Management Object (SACMO) specification, which aims to enable remote operations for software and application control in the client (It should be appreciated that the server and the client described below refer to the SACMO server and the SACMO client respectively), and is used for setting up parameters and operational functionality necessary for managing workflow object. More specifically, the server sends a management object tree to the client for setting up the workflow. If a "Start" operation corresponding to the management object tree in the client is triggered, then the client executes the workflow according to the management object tree until the workflow is completed or an error occurs.

A workflow is a sequence of steps which is conditionally executed. Each step can be an operation, process, command or other type of resource. Between steps, a condition is used to determinate the next step. Please refer to FIG. 1, which illustrates a schematic diagram of a workflow according to the prior art. In FIG. 1, a process (Process 1-3) is a basic unit for a specific operation execution, e.g. downloading software, checking memory size of the device. A process consists of a uniform resource identifier (URI) path which indicates the node of management object to execute and is indicated by a unique process identity. A step (Step A-C) is a basic unit of the workflow which consists of a process and information for the next steps. A step must have a process identity to indicate the process to execute. If a step is followed by another step, a nextstep subtree (NextStep B-C) is created. The nextstep subtree may contain multiple next steps. Each next step has a nextstep identity to indicate the following step and optionally a condition. The client checks the condition, if the condition is passed, and then the next step will be executed.

On the other hand, a transaction is an instance of a workflow execution. Server may retrieve result of the transaction execution from a "status" node under the management object tree for the workflow. As can be seen, in current design in SACMO, server retrieves the information in "Status" node under the management object tree to know the execution result of the transaction. However, there is no method to know the execution result of each step. Thus, the sever cannot know the progress of the transaction and cannot find out the cause if the transaction is executed unsuccessfully.

SUMMARY OF THE INVENTION

The disclosure therefore provides a method of handling step execution result in software and application control management object to solve the abovementioned problems.

A method of handling a step execution result in software and application control management object (SACMO) for a client of a service system supporting Open Mobile Alliance (OMA) device management (DM) is disclosed. The method comprises transmitting an execution result corresponding to a step in the SACMO to a server of the service system when the step is executed.

A method of handling a step execution result in software and application control management object (SACMO) for a client of a service system supporting Open Mobile Alliance (OMA) device management (DM) is disclosed. The method comprises transmitting an execution result corresponding to a step in the SACMO to a server of the service system when the step is executed and is set to report.

A method of handling a step execution result in software and application control management object (SACMO) for a client of a service system supporting Open Mobile Alliance (OMA) device management (DM) is disclosed. The method comprises storing an execution result corresponding to a step in a node of a management object tree in the SACMO when the step is executed, whereby a server of the service system obtains the execution result corresponding to the step via the node.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
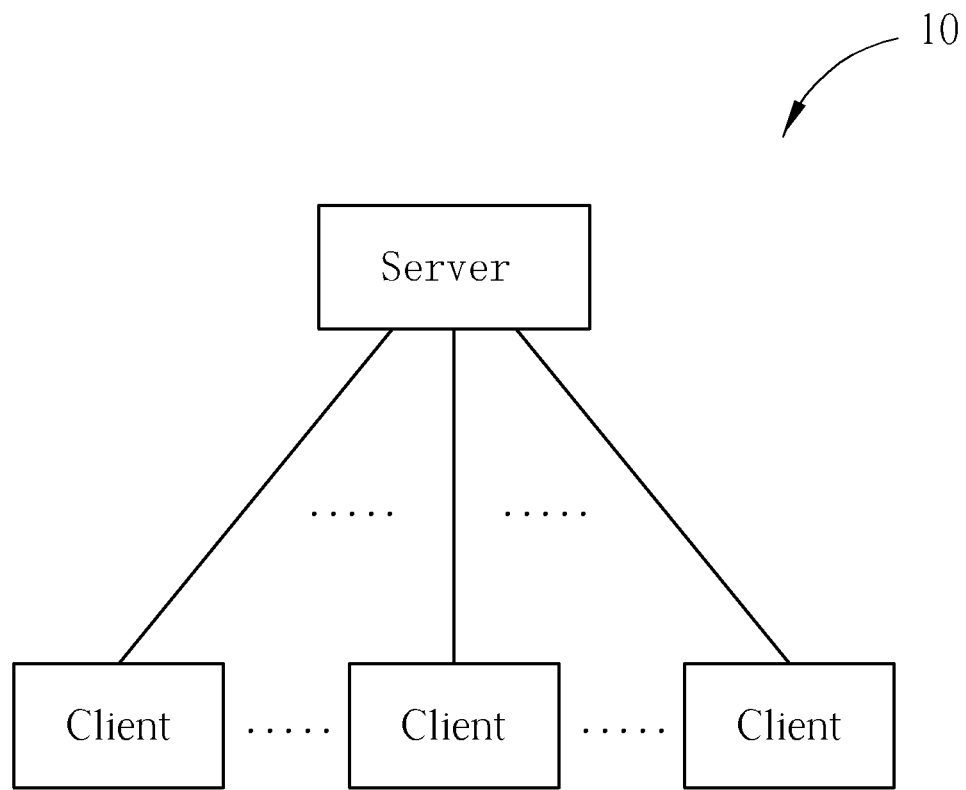
FIG. 2 is a schematic diagram of a service system according to an example of the present disclosure.

Please refer to FIG. 2, which is a schematic diagram of a service system 10 according to an example of the present disclosure. The service system 10 supports an Open Mobile Alliance (OMA) Device Management (DM) protocol and is briefly composed of a server and a plurality of DM clients (hereafter clients for short). Further, the server and the plurality of clients conform to the Software and Application Control Management Object (SACMO). Therefore, when the server requires a client to execute a workflow comprising a plurality of steps (e.g. processes or commands), the server transforms the workflow into a management object tree, and transmits the management object tree to the client. After the client receives the management object tree, if a "Start" operation corresponding to the management object tree in the client is triggered, then the client executes the workflow according to the management object tree. Note that, a transaction is an instance of a workflow execution.

Figure 1:
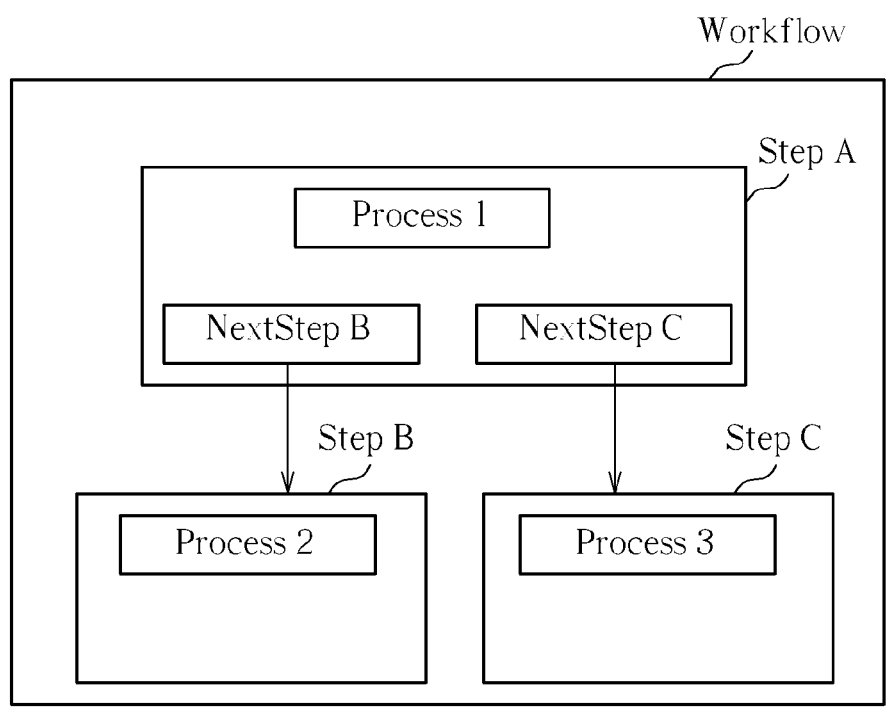
FIG. 1 is a schematic diagram of a workflow according to the prior art.
Figure 3:
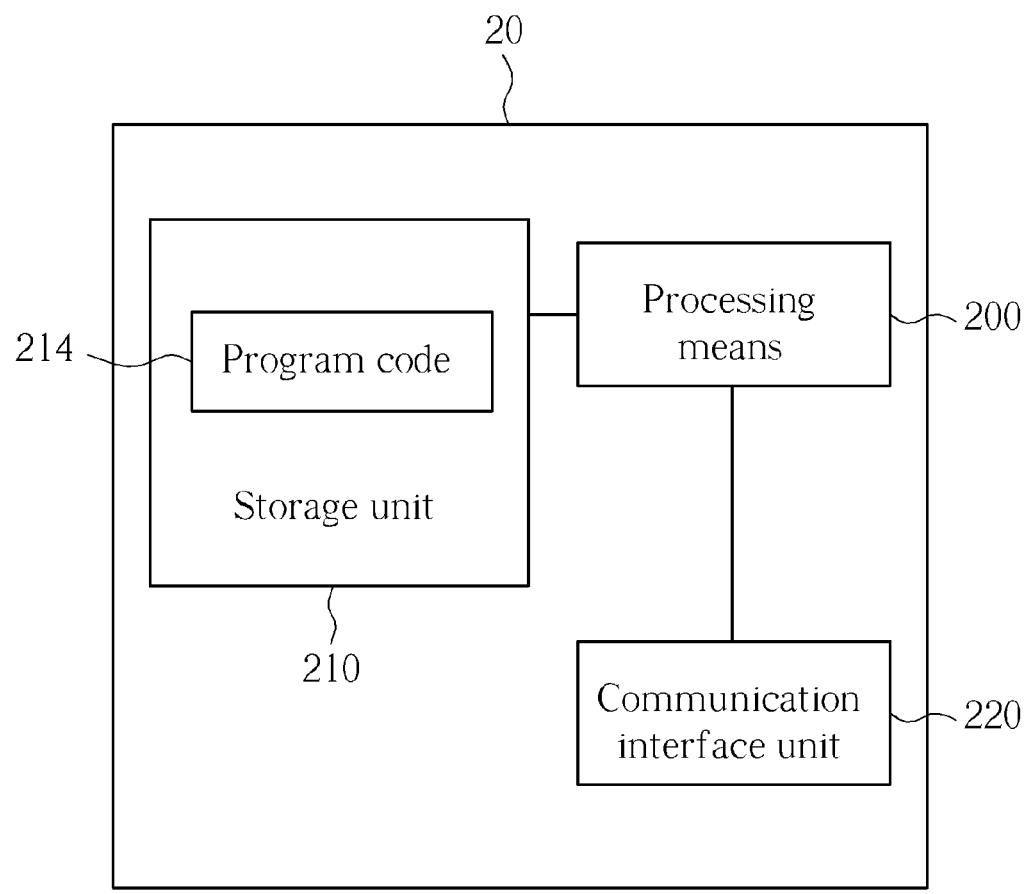
FIG. 3 is a schematic diagram of an exemplary communication device according to the present disclosure.

Please refer to FIG. 3, which is a schematic diagram of a communication device 20 according to an example of the present disclosure. The communication device 20 can be the client or the server shown in FIG. 1, but is not limited herein. The communication device 20 may include a processor 200 such as a microprocessor or Application Specific Integrated Circuit (ASIC), a storage unit 210 and a communication interface unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals with the server according to processing results of the processor 200.

Figure 4:
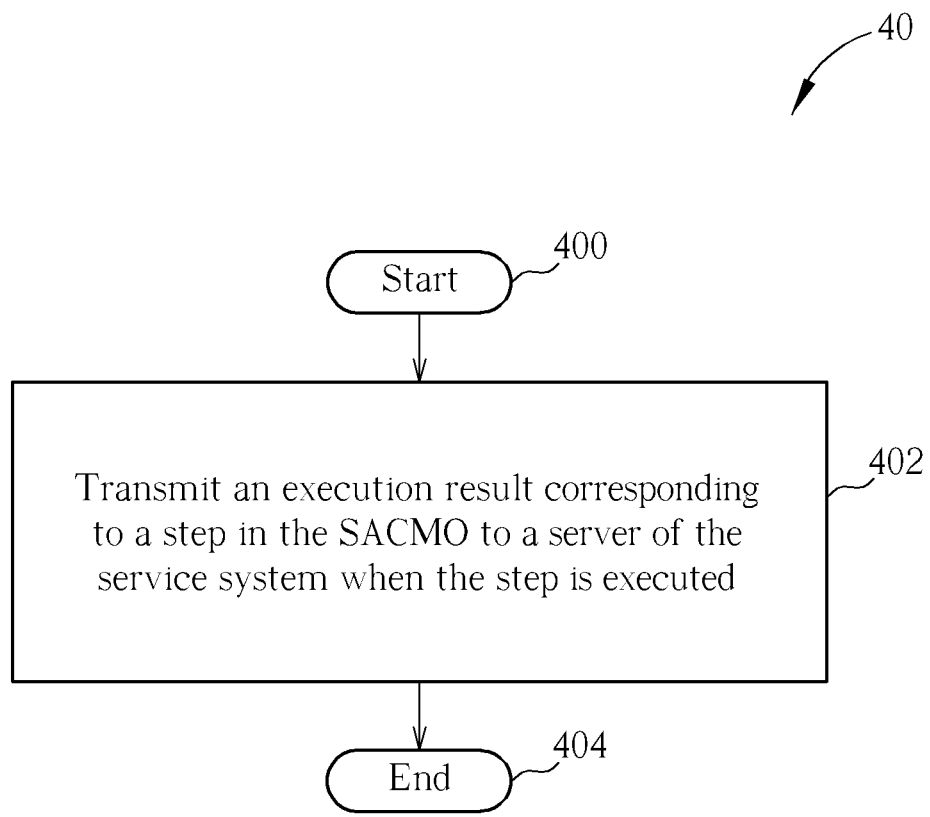
FIGS. 4-6 are flowcharts of exemplary processes according to the present disclosure.

Please refer to FIG. 4, which is a flowchart of a process 40 according to an example of the present disclosure. The process 40 is utilized to handle an execution result of a step in the SACMO for the client of the service system 10 shown in FIG. 1, so that the server can know the progress of a transaction and find out the cause if the transaction is executed unsuccessfully. The process 40 may be compiled into the program code 214 and includes the following steps:

Step 400: Start.

Step 402: Transmit an execution result corresponding to a step in the SACMO to a server of the service system when the step is executed.

Step 404: End.

According to the process 40, the client sends the execution result of the step to the server after the step is executed, so that the server knows the execution result of each step and can find out the unsuccessful reason of the transaction. The execution result can be a result code or an outcome of the execution. For example, if the result code is 1200, which means the step is successfully executed. The full description for the result code can be referred to the OMA SACMO Specification, so it is not given herein.

Note that, there are two methods for the step execution result transmission. In the first method, the client may send execution results of multiple steps in one message (e.g. a DM message) or multiple DM messages. For example, the client generates a first execution result of a first step when the first execution is executed, and generates a second execution result of a second step when the second execution is executed. In this case, the client may include the first and second execution message in the same message or different messages for transmission. In the second method, the client may combine multiple execution results to one execution result. For example, the client executes multiple steps, and generates multiple execution results. The client combines the execution results if they have the same outcome or the result code. Therefore, the client reports one result code or outcome corresponding to the steps to the server.

Figure 5:
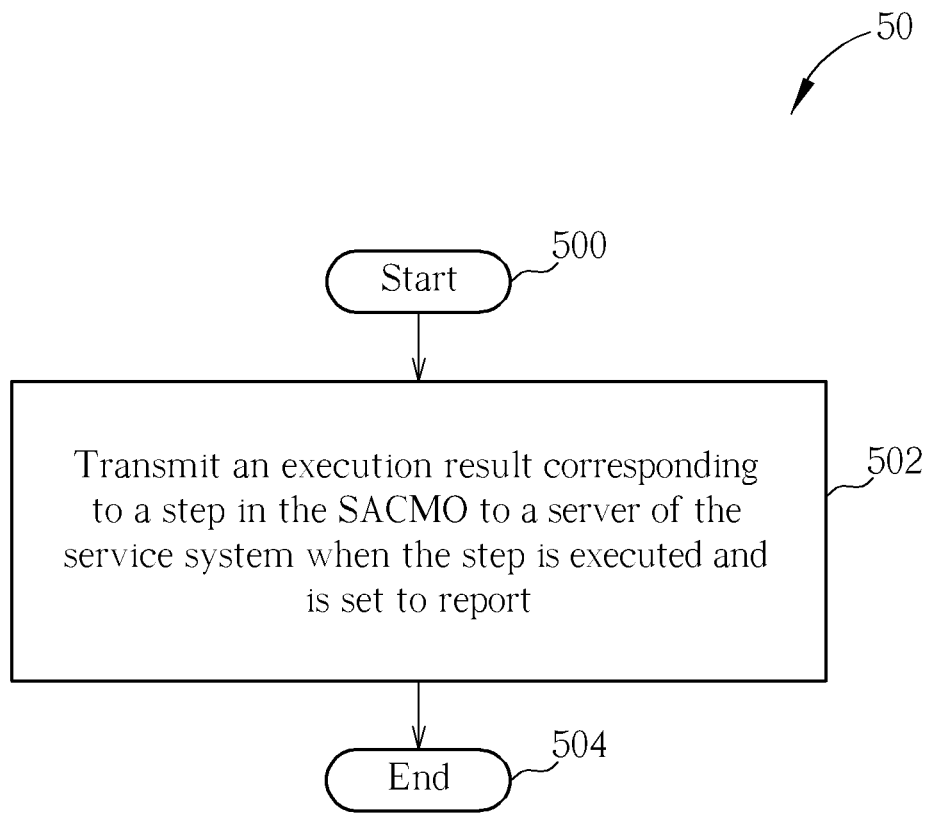

Please refer to FIG. 5, which is a flowchart of a process 50 according to an example of the present disclosure. The process 50 is utilized to handle an execution result of a step in the SACMO for the client of the service system 10 shown in FIG. 1, so that the server can know the progress of a transaction and find out the cause if the transaction is executed unsuccessfully. The process 50 may be compiled into the program code 214 and includes the following steps:

Step 500: Start.

Step 502: Transmit an execution result corresponding to a step in the SACMO to a server of the service system when the step is executed and is set to report.

Step 504: End.

According to process 50, the client sends the execution result of the step only if the step is set to report it. The execution result can be a result code or an outcome of the execution. For realization, a node corresponding to a step may be created in a management object tree conformed to the SACMO, for storing the information which indicates whether the server needs the execution result of this step or not. Therefore, after executing the step, the client sends the execution result to the server if the server needs the result of this step.

Figure 6:
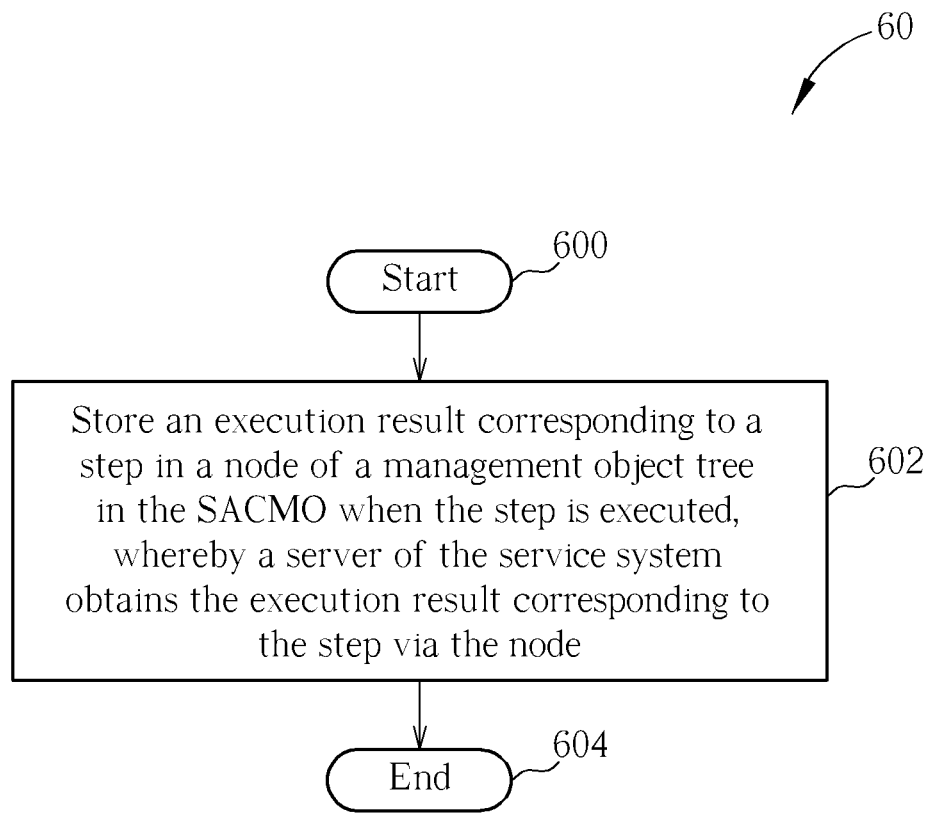

Please refer to FIG. 6, which is a flowchart of a process 60 according to an example of the present disclosure. The process 60 is utilized to handle an execution result of a step in the SACMO for the client of the service system 10 shown in FIG. 1, so that the server can know the progress of a transaction and find out the cause if the transaction is executed unsuccessfully. The process 60 may be compiled into the program code 214 and includes the following steps:

Step 600: Start.

Step 602: Store an execution result corresponding to a step in a node of a management object tree in the SACMO when the step is executed, whereby a server of the service system obtains the execution result corresponding to the step via the node.

Step 604: End.

According to the process 60, a node has been created in the management object tree conformed to the SACMO for storing the execution result of the step. The execution result can be a result code or an outcome of the execution. Therefore, the server retrieves the information in the node to know the execution result of the step, so as to know the progress of the transaction and find out the unsuccessful reason of the transaction.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, several methods of handling step execution result in the SACMO are disclosed. The client may directly transmit execution result of each step, or steps which is indicated to be reported to the server, or store the execution result of the step in the node, so that the server can know the progress of the transaction and find out the reason if the transaction is unsuccessfully executed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a step execution result in software and application control management object (SACMO) for a device management (DM) client of a service system supporting Open Mobile Alliance (OMA) device management (DM), the method comprising:
   the DM client transmitting an execution result corresponding to a step of a workflow in the SACMO to a DM server of the service system when the step of the workflow is executed;
   wherein the DM client transmitting the execution result corresponding to the step of the workflow in the SACMO to the DM server of the service system when the step of the workflow is executed comprises:
      the DM client generating a first execution result representing a consequence of executing a first step of the workflow in the SACMO after the DM client executes the first step;
      the DM client generating a second execution result representing another consequence of executing a second step of the workflow in the SACMO after the DM client executes the second step;
      comparing the first execution result with the second execution result to generate a comparison result;
      the DM client combining the first and second execution results into only one execution result and transmitting the only one execution result to the DM server in one DM message when the comparison result indicates that the first and second execution results have same outcome or result code; and
      the DM client transmitting the first execution result corresponding to the first step to the DM server in a first DM message and transmitting the second execution result corresponding to the second step to the DM server in a second DM message when the comparison result indicates that the first and second execution results have different outcomes or result codes, wherein the first DM message and the second DM message are different DM messages.

2. The method of claim 1, wherein the execution result is a result code or an outcome of executing the step.

3. The method of claim 1, wherein transmitting the execution result corresponding to the step of the workflow in the SACMO to the server of the service system when the step of the workflow is executed comprises:
   transmitting a first execution result corresponding to a first step to the server with a first message after the first step is executed; and
   transmitting a second execution result corresponding to a second step to the server with a second message after the second step is executed;
   wherein the first message and the second message are different.

4. The method of claim 1, wherein transmitting the execution result corresponding to the step of the workflow in the SACMO to the server of the service system when the step of the workflow is executed comprises:
   transmitting a first execution result corresponding to a first step to the server with a first message after the first step is executed; and
   transmitting a second execution result corresponding to a second step to the server with the first message after the second step is executed.

5. A method of handling a step execution result in software and application control management object (SACMO) for a device management (DM) client of a service system supporting Open Mobile Alliance (OMA) device management (DM), the method comprising:
   the DM client transmitting an execution result corresponding to a step of a workflow in the SACMO to a DM server of the service system when the step of the workflow is executed and is set to report which is optionally determined in a management object tree conformed to the SACMO;
   wherein the DM client transmitting the execution result corresponding to the step of the workflow in the SACMO to the DM server of the service system when the step of the workflow is executed and is set to report comprises:
      the DM client generating a first execution result representing a consequence of executing a first step of the workflow in the SACMO after the DM client executes the first step;
      the DM client generating a second execution result representing another consequence of executing a second step of the workflow in the SACMO after the DM client executes the second step;
      comparing the first execution result with the second execution result to generate a comparison result;
      the DM client combining the first and second execution results into only one execution result and transmitting the only one execution result to the DM server in one DM message when the comparison result indicates that the first and second execution results have same outcome or result code; and
      the DM client transmitting the first execution result corresponding to the first step to the DM server in a first DM message and transmitting the second execution result corresponding to the second step to the DM server in a second DM message when the comparison result indicates that the first and second execution results have different outcomes or result codes, wherein the first DM message and the second DM message are different DM messages.

6. The method of claim 5, wherein the execution result is a result code or an outcome of executing the step.

7. A method of handling a step execution result in software and application control management object (SACMO) for a device management (DM) client of a service system supporting Open Mobile Alliance (OMA) device management (DM), the method comprising:

the DM client storing an execution result corresponding to a step of a workflow in a node of a management object tree in the SACMO when the step of the workflow is executed, whereby a DM server of the service system obtains the execution result corresponding to the step via the node;

wherein the DM client storing an execution result corresponding to a step of the workflow in a node of a management object tree in the SACMO when the step of the workflow is executed, whereby a DM server of the service system obtains the execution result corresponding to the step via the node comprises:

the DM client generating a first execution result representing a consequence of executing a first step of the workflow in the SACMO after the DM client executes the first step;

the DM client generating a second execution result representing another consequence of executing a second step of the workflow in the SACMO after the DM client executes the second step;

comparing the first execution result with the second execution result to generate a comparison result;

the DM client combining the first and second execution results into only one execution result and transmitting the only one execution result to the DM server in one DM message when the comparison result indicates that the first and second execution results have same outcome or result code; and the DM client transmitting the first execution result corresponding to the first step to the server in a first DM message and transmitting the second execution result corresponding to the second step to the DM server in a second DM message when the comparison result indicates that the first and second execution results have different outcomes or result codes, wherein the first DM message and the second DM message are different DM messages.

8. The method of claim 7, wherein the execution result is a result code or an outcome of executing the step.

* * * * *